US012517722B2

(12) United States Patent
Chibon et al.

(10) Patent No.: US 12,517,722 B2
(45) Date of Patent: Jan. 6, 2026

(54) PER-HOST DELTA-DIFFERENCE GENERATION IN UPDATE MANAGEMENT SYSTEMS

(71) Applicant: Red Hat, Inc., Raleigh, NC (US)

(72) Inventors: Pierre-Yves Chibon, Saint-pol-de-Léon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 549 days.

(21) Appl. No.: 17/579,805

(22) Filed: Jan. 20, 2022

(65) Prior Publication Data
US 2023/0229429 A1  Jul. 20, 2023

(51) Int. Cl.
*G06F 8/658* (2018.01)
(52) U.S. Cl.
CPC .................. *G06F 8/658* (2018.02)
(58) Field of Classification Search
CPC .................. G06F 8/658; G06F 8/70
USPC ......................................... 717/170
See application file for complete search history.

(56) References Cited

U.S. PATENT DOCUMENTS

| 9,417,865 B2 | 8/2016 | Vidal et al. | |
| 2003/0220944 A1* | 11/2003 | Lyman Schottland | G06F 8/658 707/999.203 |
| 2004/0068721 A1* | 4/2004 | O'Neill | G06F 8/65 709/202 |
| 2004/0098427 A1* | 5/2004 | Peng | G06F 8/654 |
| 2007/0208786 A1* | 9/2007 | Kim | G06F 8/658 707/999.203 |
| 2007/0294685 A1* | 12/2007 | Oh | G06F 8/658 717/168 |
| 2007/0294686 A1* | 12/2007 | Oh | G06F 8/658 717/168 |
| 2008/0130639 A1* | 6/2008 | Costa-Requena | H04L 67/51 370/389 |
| 2012/0011496 A1* | 1/2012 | Shimamura | G06F 9/44521 717/170 |
| 2012/0144378 A1 | 6/2012 | Shah | |

(Continued)

FOREIGN PATENT DOCUMENTS

| CN | 112256315 A | * | 1/2021 |
| JP | 2000330910 A | * | 11/2000 |

(Continued)

*Primary Examiner* — Phillip H Nguyen
(74) *Attorney, Agent, or Firm* — Womble Bond Dickinson (US) LLP

(57) ABSTRACT

Embodiments of the present disclosure relate to systems and methods for generating delta-difference on an on-demand basis. A delta-difference generation service receives, from each of one or more of a plurality of nodes, a list of packages for which the node wishes to subscribe to the delta-difference generation service. Each of the one or more nodes may include in their list those packages that may benefit the most from use of the delta-difference generation service have based on a variety of factors such as package update frequency and resource availability of the node. In response to receiving an updated version of a package included in a list received from any of the one or more nodes, a delta-difference between a current version and the updated version of the package may be generated and transmitted to each of the one or more nodes that included the package in their respective list.

11 Claims, 9 Drawing Sheets

(56) References Cited

U.S. PATENT DOCUMENTS

| | | | |
|---|---|---|---|
| 2014/0123124 A1* | 5/2014 | Gray et al. | G06F 8/654 |
| | | | 717/170 |
| 2014/0173588 A1* | 6/2014 | Ko | G06F 8/658 |
| | | | 717/173 |
| 2015/0089489 A1* | 3/2015 | Sarkar et al. | G06F 8/656 |
| | | | 717/173 |
| 2015/0277898 A1 | 10/2015 | Deng | |
| 2017/0039052 A1* | 2/2017 | Balacgandran et al. | |
| | | | G06F 8/658 |
| 2020/0081697 A1 | 3/2020 | Sillankorva | |
| 2021/0232381 A1* | 7/2021 | Winblad | G06F 9/4403 |
| 2021/0349710 A1* | 11/2021 | Kang et al. | G06F 8/658 |

FOREIGN PATENT DOCUMENTS

| | | | | |
|---|---|---|---|---|
| KR | 20080037450 A * | 4/2008 | | G06F 8/71 |
| RU | 2388045 C2 * | 4/2010 | | G06F 8/658 |
| WO | WO-2020093398 A1 * | 5/2020 | | G06F 21/57 |

* cited by examiner

PER-HOST DELTA-DIFFERENCE GENERATION IN UPDATE MANAGEMENT SYSTEMS

TECHNICAL FIELD

Aspects of the present disclosure relate to package management systems, and more particularly, to on-demand generation of delta-difference for packages utilized by an operating system to run various applications on containers across a domain.

BACKGROUND

Containers are one example of an environment in an operating system where applications may run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
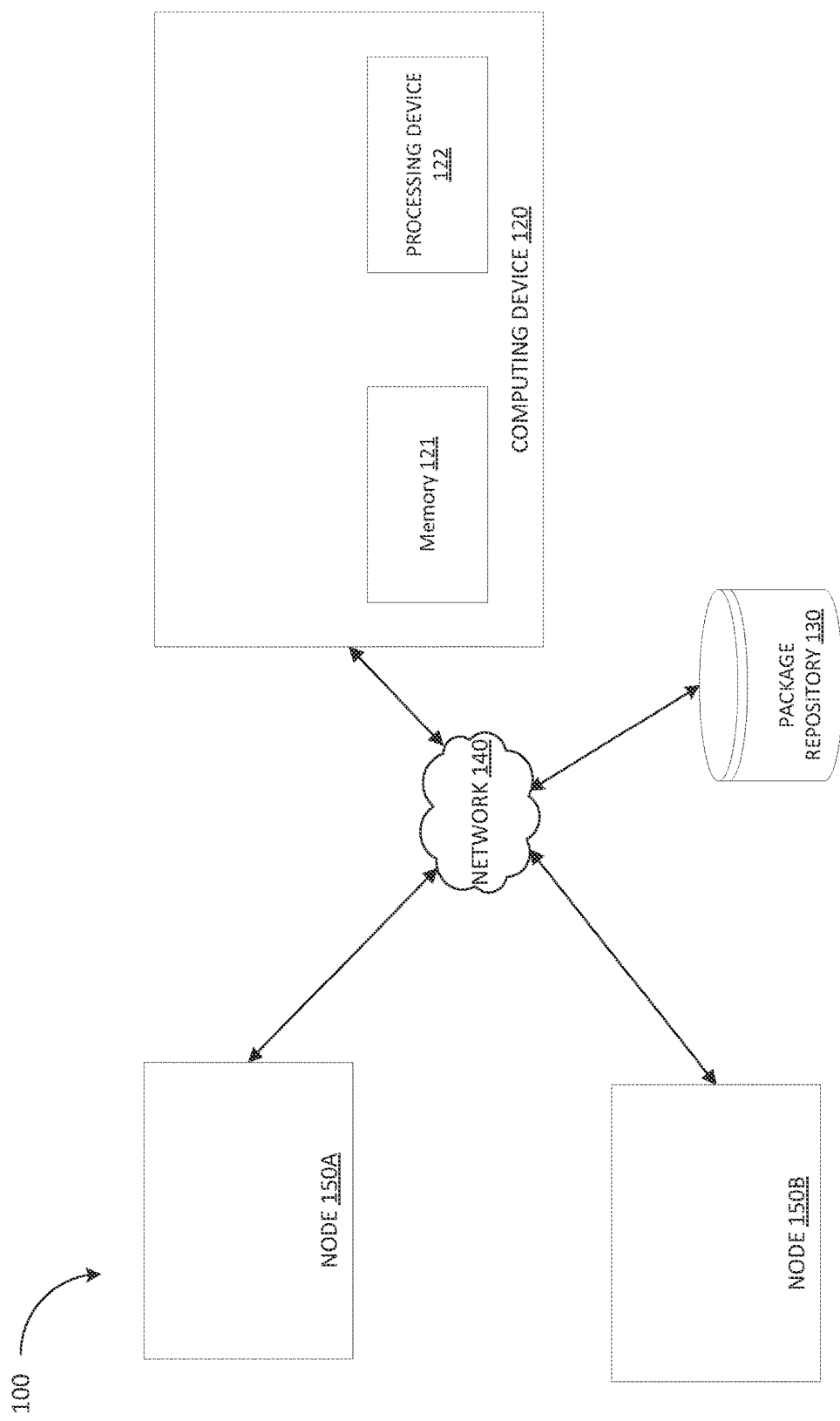
FIG. 1A is a block diagram that illustrates an example system, in accordance with some embodiments of the present disclosure.

There are numerous contexts in which applications are often developed, tested, and delivered in containers using a container orchestration platform such as the Red Hat OpenShift™ platform. One example is the use of such platforms to automate and push software as containers to small-scale edge and Internet-of-Things (IoT) gateway devices in a domain. A domain may include of a group of devices that share the same configuration, policies, and identity stores. Containers may be created by stacking layers on top of each other to build an image file which may be used to create a container in which an application may run. Certain layers of an image file may correspond to various packages and libraries required to run the application, while other layers may correspond to various operating system packages via which applications are delivered and which are often shared among different applications. The packages and libraries used to run applications (referred to as an application ecosystem) may be managed by a package manager such as Dandified YUM (DNF) or the RPM package manager. Package management may refer to a method of installing, updating, removing, and keeping track of versions/software updates for packages in e.g., a Linux system. For example, the packager manager decides what packages should be grouped together and a basis on which they will update (e.g., packages in a particular group will not update except for necessary bug fixes and/or security fixes). Different Linux distributions may utilize different package managers.

In certain scenarios, such as a domain comprising a fleet of IoT devices, the devices/nodes of the domain can be bandwidth constrained either in time (because they are so actively used) or in speed even more than they are CPU constrained. In such scenarios, optimizing the amount of data downloaded during a particular period of time may present a challenge, especially for updates to packages as these can easily accumulate over time if the devices cannot connect to the internet for long periods of time. This problem can be exacerbated when packages are frequently updated (e.g., with patch updates, bug fixes, etc.).

Delta-difference generation is a mechanism by which a delta-difference between two packages (a new one and an old one) is generated. That difference can then be downloaded by the client which is then able to reconstruct the new package from the combination of the old package and delta-difference. However, generating a delta-difference can be a costly process, both in terms of time requirements and in storage requirements as one needs the exact versions of the new and the old packages to compute the delta-difference. As the number of nodes in a domain grows, the various nodes will likely diverge over time at the individual node level. Thus, generating a delta-difference for each of the nodes in a domain can quickly become cumbersome. In addition, the benefits of generating delta-differences in such fleets are further reduced when there is a significant number of micro-differences between nodes that do not justify the cost of delta-difference generation.

The present disclosure addresses the above-noted and other deficiencies by using a processing device to receive, from each of one or more of a plurality of nodes, a list of packages for which the node wishes to subscribe to a delta-difference generation service. Each of the one or more nodes may include in their list those packages that may benefit the most from use of the delta-difference generation service have based on a variety of factors such as package update frequency and resource availability of the node. The delta-difference generation service may be integrated within an update management tool as opposed to a package manager, and in response to receiving an updated version of a package included in a list received from any of the one or more nodes, generate a delta-difference between a current version and the updated version of the package. The delta-difference generation service may transmit the delta-difference generated for each package to each of the one or more nodes that included the package in their respective list. Embodiments of the present disclosure ensure that delta-difference generation is performed on demand on a node by node basis and that computational resources are not wasted generating unnecessary/ineffective delta-differences. The techniques herein enable individual nodes (or an administrator) to specify a package by package on demand strategy for each node and change it based on the changing needs of the node. The embodiments described herein also prevent the risk of stale delta-differences being made available, which would in turn adversely affect storage availability as well as result in a deviation from what the domain perceives as the latest version of a package.

FIG. 1A is a block diagram that illustrates an example system 100. As illustrated in FIG. 1A, the system 100 includes a computing device 120, a package repository 130, nodes 150A and 150B, and a network 140. The computing device 120, nodes 150, and the package repository 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120, nodes 150, and the package repository 130. Each of the computing device 120, nodes 150, and the package repository 130 may include hardware such as processing device 122 (e.g., processors, central processing units (CPUs), memory 121 (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Each of the computing device 120, nodes 150, and the package repository 130 may comprise any suitable type of computing device or machine that has a programmable processor including, for example, server computers, desktop computers, laptop computers, tablet computers, smartphones, set-top boxes, etc. In some examples, the computing device 120, nodes 150, and the package repository 130 may comprise a single machine or may include multiple interconnected machines (e.g., multiple servers configured in a cluster). The computing device 120, nodes 150, and the package repository 130 may be implemented by a common entity/organization or may be implemented by different entities/organizations. For example, computing device 120 may be operated by a first company/corporation and package repository 130 may be operated by a second company/corporation. The computing device 120, nodes 150, and the package repository 130 may each execute or include an operating system (OS), as discussed in more detail below. The OSs of computing device 120 (shown in FIG. 1B as host OS 221), nodes 150, and the package repository 130 may manage the execution of other components (e.g., software, applications, etc.) and/or may manage access to the hardware (e.g., processors, memory, storage devices etc.) of their respective computing device.

The computing device 120 and nodes 150 may form a domain. A domain may include of a group of devices that share the same configuration, policies, and identity stores. The shared properties allow the devices within the domain to be aware of each other and operate together. The computing device 120 and the nodes 150 may all be individual devices that are a part of a domain representing e.g., a fleet of internet of things (IoT) devices.

Figure 1B:
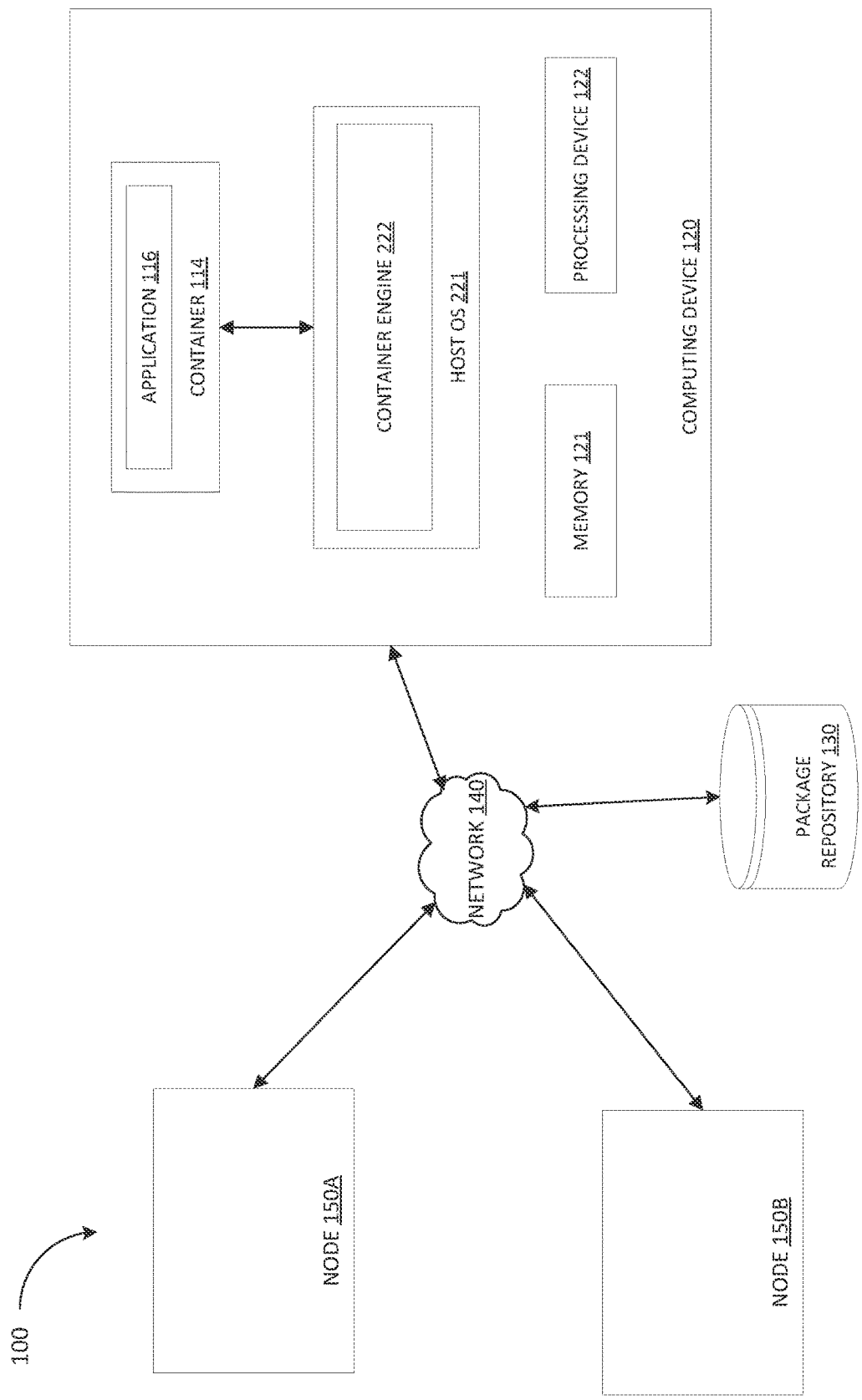
FIG. 1B is a block diagram that illustrates an example system, in accordance with some embodiments of the present disclosure.

As illustrated in FIG. 1B, the computing device 120 (and any of the nodes 150) may include a container 114. In some embodiments, the container 114 may execute on a container engine 222 which executes on top of the host OS 221 of computing device 120. The container engine 222 may allow different containers to share the host OS 221 (e.g., the OS kernel, packages 223, binaries, libraries thereof etc.) and may also perform other functions, as discussed in more detail below. The container 114 may be isolated, in that it is not connected to any other device or component of system 100, whether virtual or otherwise. Container 114 may execute application 116, which may be any application that requires certain packages 223 to facilitate its operation.

Figure 2A:
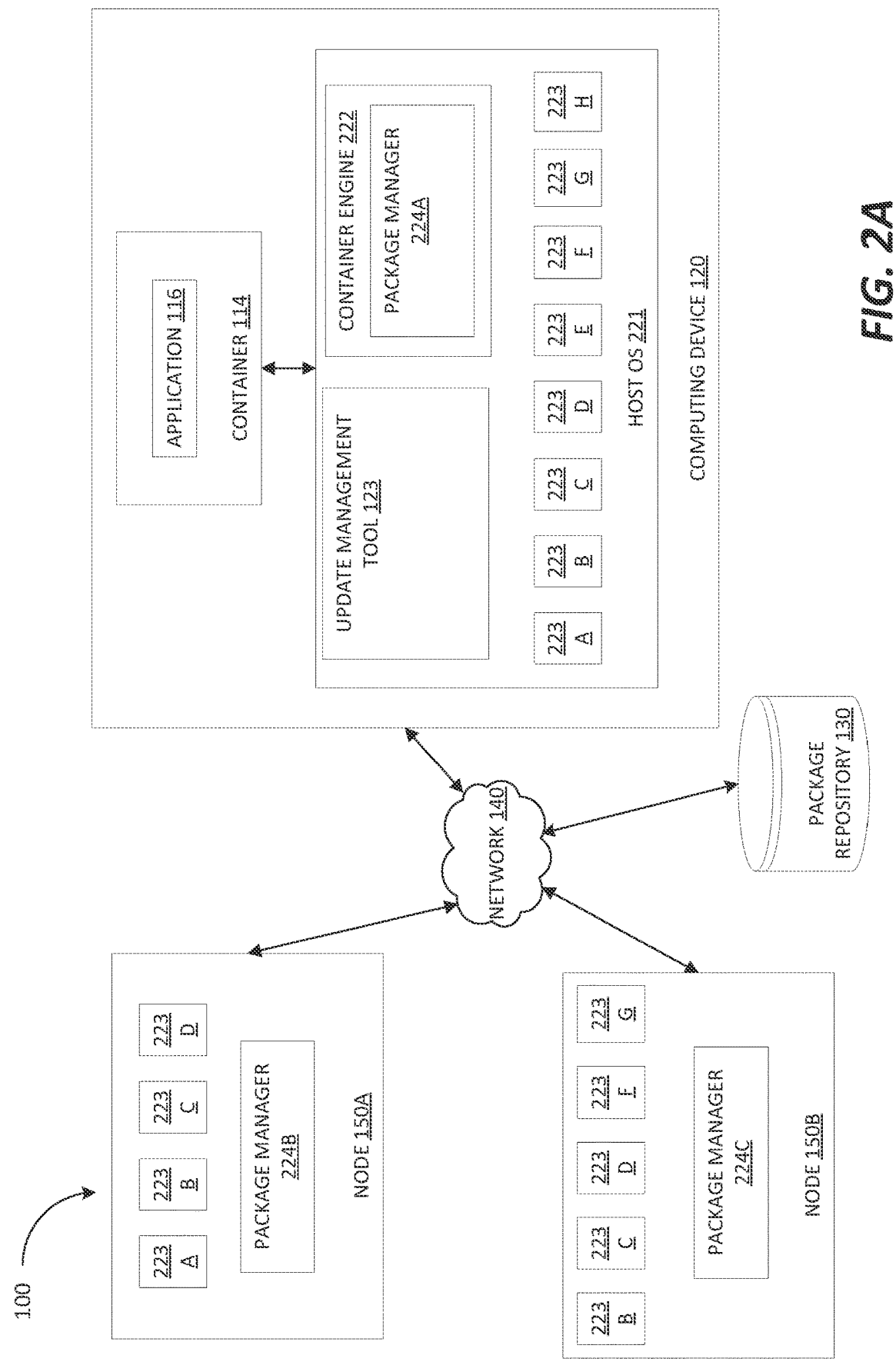
FIG. 2A is a block diagram that illustrates packages executing on each node of a domain and an update monitoring tool that monitors the domain, in accordance with some embodiments of the present disclosure.

As shown in FIG. 2A, the container 114 may share the OS kernel and packages 223 (e.g., libraries, binary files and source files) of the host OS 221 with other containers (not shown) that are executing on the computing device 120. Although FIG. 2A illustrates one container 114, the computing device 120 (and any of the nodes 150) may execute multiple containers in other embodiments. Each container may have one or more respective file systems, memories, devices, network ports, etc., for accessing the physical resources of the computing device it is running on (e.g., processing device 122 and memory 121, shown in FIGS. 1A and B).

The container engine 222 may allow different containers to share the host OS 221 (including e.g., the OS kernel as well as relevant packages 223 including any associated libraries, binary and/or source files etc.) of the computing device 120. For example, the container engine 222 may multiplex the packages 223 of the host OS 221 between multiple containers as discussed in further detail herein. The container engine 222 may also facilitate interactions between the container 114 and the resources of the computing device 120 and may manage requests from the container 114 to access certain packages 223 of the host OS 221. Although FIG. 2A shows the packages 223 as included within the host OS 221, in some embodiments the packages 223 may be stored separately (e.g., within package repository 130) and accessed by host OS 221 as necessary.

As discussed above, the host OS of each of the computing device 120 and nodes 150 may comprise a plurality of packages 223, each of which may be a program that provides certain functionality (e.g., for executing an application). The host OS of each of the computing device 120 and nodes 150 may also include a software package manager 224 that interfaces with repositories in the package repository 130 to search for packages, as well as install, update, and remove packages on the respective host OS. The package repository 130 may comprise multiple repositories that store packages corresponding to a core set of underlying OS functionality user space applications, runtime languages, and databases in support of various types of workloads and use cases, among others. Each software package manager 224 (hereinafter referred to as package manager 224) may be any appropriate package management software such as Dandified Yum, for example. Each package manager 224 may automatically compute dependencies of a package 223 and determine any actions required to install a package. Each of the plurality of packages 223 may be in any appropriate format, such as e.g., the ".rpm" format. Stated differently, each package 223 may comprise an RPM file (e.g., based on Fedora, RHEL, etc.) or any other appropriate operating system packaging unit. Each package manager 224 may install, update, and remove packages and their dependencies on their respective computing device. Each package manager 224 may facilitate maintenance of packages 223 and their dependencies by automatically checking for further dependencies and determining the actions required to install those dependencies.

As can be seen in FIG. 2A, the computing device 120 may also execute an update management tool 123 such as the Red Hat Satellite™ tool. The update management tool 123 may consume diverse types of content (e.g., software packages, errata, and container images) from various sources (including e.g., Git repositories, Docker Hub, and an organization's internal data store, among other examples) and synchronize this content in order to provide fine-grained life cycle management for each node 150 from a single centralized device (i.e., computing device 120 in the example of FIG. 2A) and ensure that they are running efficiently, securely, and in compliance with various standards. For example, the update management tool 123 may ensure a standard operating environment (SOE) by obtaining updates on security patches, updates, and enhancements for various packages 223 of each of the computing device 120 and nodes 150. In this way, the update management tool 123 may know which packages 223 are installed on each device that it manages and the version of each package 223 that is installed on each device that it manages, allowing an administrator to view the current state of the domain. Various nodes 150 of the system 100 may pull content and configuration from the computing device 120. The computing device 120 may include significantly more processing, memory, and other resources relative to nodes 150 owing to its function as a centralized management service for the domain.

Figure 2B:
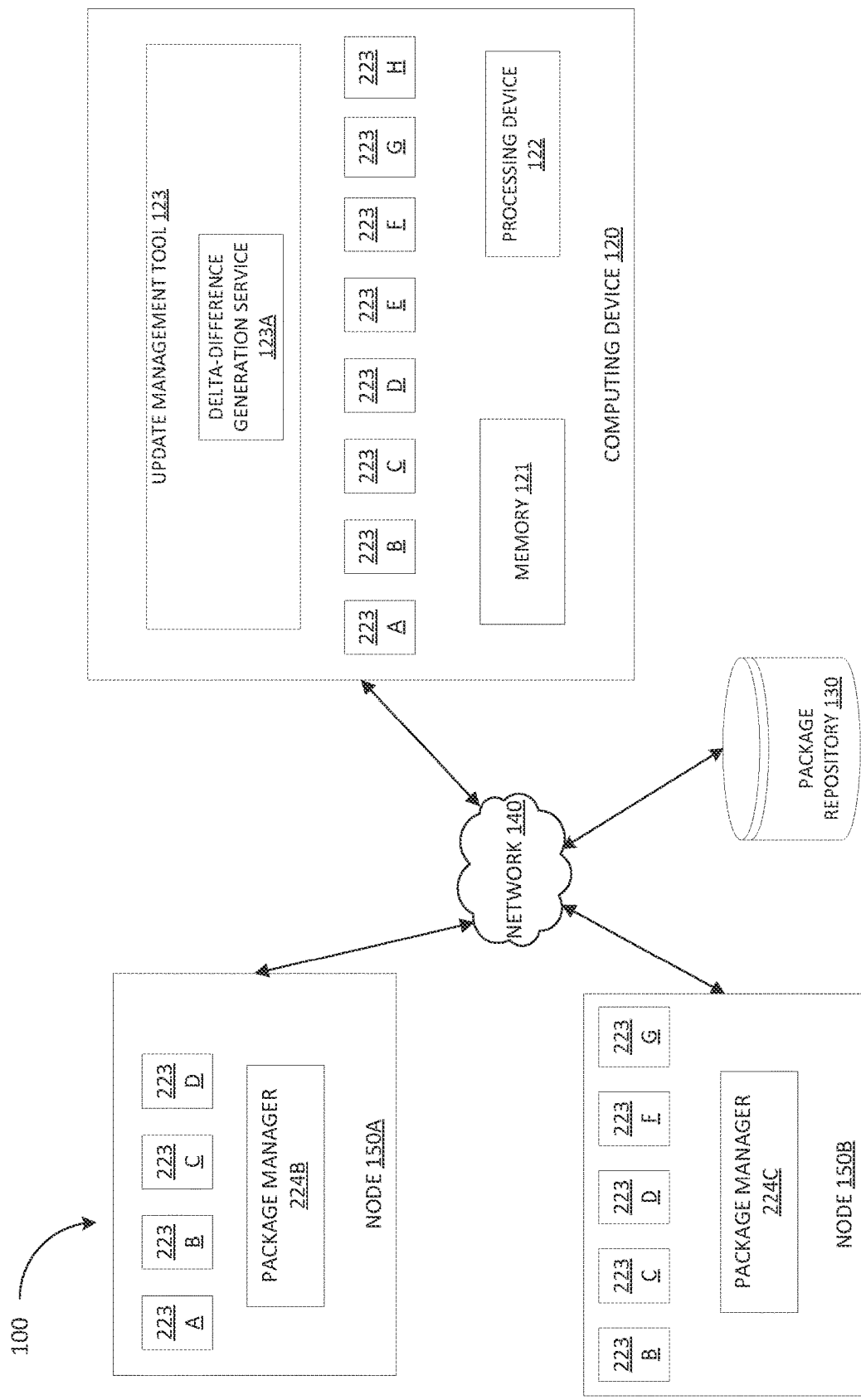
FIG. 2B is a block diagram that illustrates a delta-difference generation service integrated into an update monitoring tool, in accordance with some embodiments of the present disclosure.

As shown in FIG. 2B, the update management tool 123 may be modified with a delta-difference generation service 123A so that it can perform the delta-difference generation function for each device in the domain (as opposed to individual package managers 224), as discussed in further detail herein. Because the computing device 120 may have more resources (e.g., processing resources, memory resources, etc.) than other nodes 150 owing to its role as the host of update management tool 123, it is best suited to performing update management, delta-difference generation, and other functions as discussed in further detail herein. The update management tool 123 may generate delta-differences between packages 223 that it knows are present on the nodes 150, and updates for those packages that are arriving, and then pass these delta-differences down to individual nodes 150 that have subscribed to the delta-difference generation service 123A (as discussed in further detail herein). This allows the domain to function with a minimal footprint because it does not have to depend on resource limited nodes 150 to generate delta-differences, download the delta-differences, handle cryptography/authentication functions (e.g., decrypting RPMs, verifying GPG keys), and perform other resource intensive functions associated with generation of delta-differences. Instead, these functions can be performed by the more powerful computing device 120 which may provide a centralized service that is in charge of performing such resource intensive functions and which any node 150 in the domain can contact in order to subscribe to or unsubscribe from the delta-difference generation service 123A. The computing device 120 may generate and send delta-differences to nodes 150 that have subscribed to the delta-difference generation service 123A as discussed in further detail herein.

The update management tool 123 may offer nodes 150 the ability to subscribe to and unsubscribe from the delta-difference generation service 123A based on a variety of factors (as discussed herein), and may also allow nodes 150 to customize how they will subscribe. For example, a node 150 may subscribe to the delta-difference generation service 123A for certain packages 223 it is executing or for all of the packages 223 it is executing. In this way, the nodes 150 that can benefit the most from the delta-difference generation service 123A can subscribe to it, or may subscribe to it with respect to particular packages 223 that may benefit the most, if certain packages would not benefit and/or subscribing with respect to all of the packages running on a node 150 would not be an efficient use of resources. In this way, nodes 150 that would benefit less from the delta-difference generation service 123A may refrain from doing so or refrain from subscribing with respect to particular packages 223 that would benefit less. In some embodiments, an administrator may decide which nodes 150 may subscribe (and whether they subscribe on a full or package by package basis) to the delta-difference generation service 123A based on information about which nodes 150 have frequent update schedules (obtained from e.g., update management tool 123), resource availability of each node 150, and the types of services that run on each node 150. In other embodiments, each node 150 may have the ability to obtain and analyze this information and decide for themselves if they are good candidates to subscribe to the delta-difference generation service 123A (and whether they subscribe on a full or package by package basis). It should be noted that if multiple nodes 150 have subscribed to the delta-difference generation service 123A for the same package (e.g., package 223A), then the update management tool 123 may monitor for updates and transmit a generated delta-difference to each of the nodes 150 that have subscribed to the delta-difference generation service 123A for package 223A.

In some embodiments, the update management tool 123 can verify that nodes 150 that subscribe to the delta-difference generation service 123A meet a set of resource needs criteria corresponding to how they have subscribed (e.g., number of packages they have subscribed for, name/type of packages they have subscribed for).

The update management tool 123 may continuously monitor one or more of the package repository 130, a git repository (not shown), a public data store (not shown), and an organization's internal (private) data store (not shown) for new updates to packages 223 of nodes 150 that have subscribed to the delta-difference generation service 123A (or monitor for updates to the particular packages 223 they have subscribed for if applicable), and may discard old delta-differences which have been generated based on previous versions of a package upon identifying a new update for the package. For example, if node 150A has a package called foo 1.0.0-1 and an update referred to as foo 1.0.0-2 is identified by the update management tool 123, if node 150A has subscribed to the delta-difference generation service 123A, then the delta-difference generation service 123A may generate a delta-difference between foo 1.0.0-1 and foo 1.0.0-2. The update management tool 123 may transmit the generated delta-difference to the node 150A, which may install foo 1.0.0-2 based on the generated delta-difference at the next opportunity as discussed in further detail herein. If the node 150A has not installed foo 1.0.0-2 when another subsequent update referred to as foo 1.0.1-1 is identified by the update management tool 123, the delta-difference generation service 123A may discard the delta-difference generated based on foo 1.0.0-1 and foo 1.0.0-2 and generate a new delta-difference between foo 1.0.0-1 and foo 1.0.1-1. The delta-difference generation service 123A does not need to generate a delta-difference between foo 1.0.0-2 and foo 1.0.1-1 because 1.0.0-2 was never present on computing device 150. If the node 150A has installed foo 1.0.0-2 when foo 1.0.1-1 is identified by the update management tool 123, the delta-difference generation service 123A may discard the delta-difference generated based on foo 1.0.0-1 and foo 1.0.0-2 and generate a new delta-difference between foo 1.0.0-2 and foo 1.0.1-1.

This allows the delta-difference generation service 123A to generate delta-differences as they are needed (e.g., when a node 150 having the relevant packages 223 has subscribed), rather than generating delta-differences every time an update for any package on any node is identified. Without using the embodiments of the present disclosure, in the example above the delta-difference generation service 123A would continuously generate delta-differences between each of the various combinations and permutations of updates (regardless of whether they are useful/effective), resulting in a massive number of delta-differences that occupy a large amount of storage resources. In addition, without the subscription mechanism the delta-difference generation service 123A would not know which delta-difference is relevant to/needs to be transmitted to which node 150.

Because resource availability of a node 150 may change over time, and certain services may be activated or suspended over time, each node 150 may also update its list of packages for which it wishes to subscribe to the delta-difference generation service 123A on any appropriate basis (by performing the same analysis as described above). For example, a node 150 may update its list periodically, or in response to sudden shifts in the availability of resources or activation/deactivation of certain services.

Figure 3A:
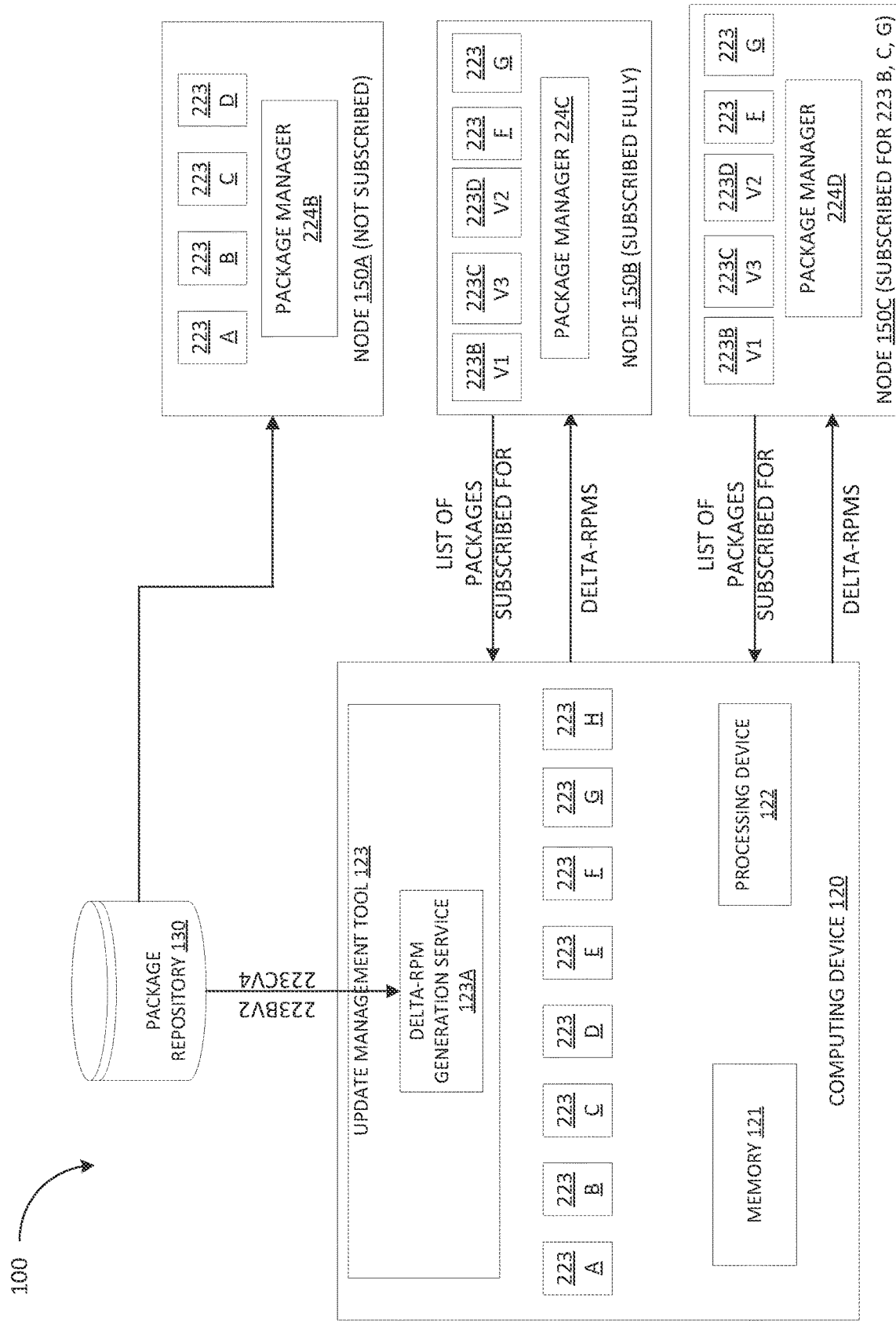
FIG. 3A is a block diagram that illustrates various nodes of a domain subscribing to a delta-difference generation service in an on-demand basis, in accordance with some embodiments of the present disclosure.
Figure 3B:
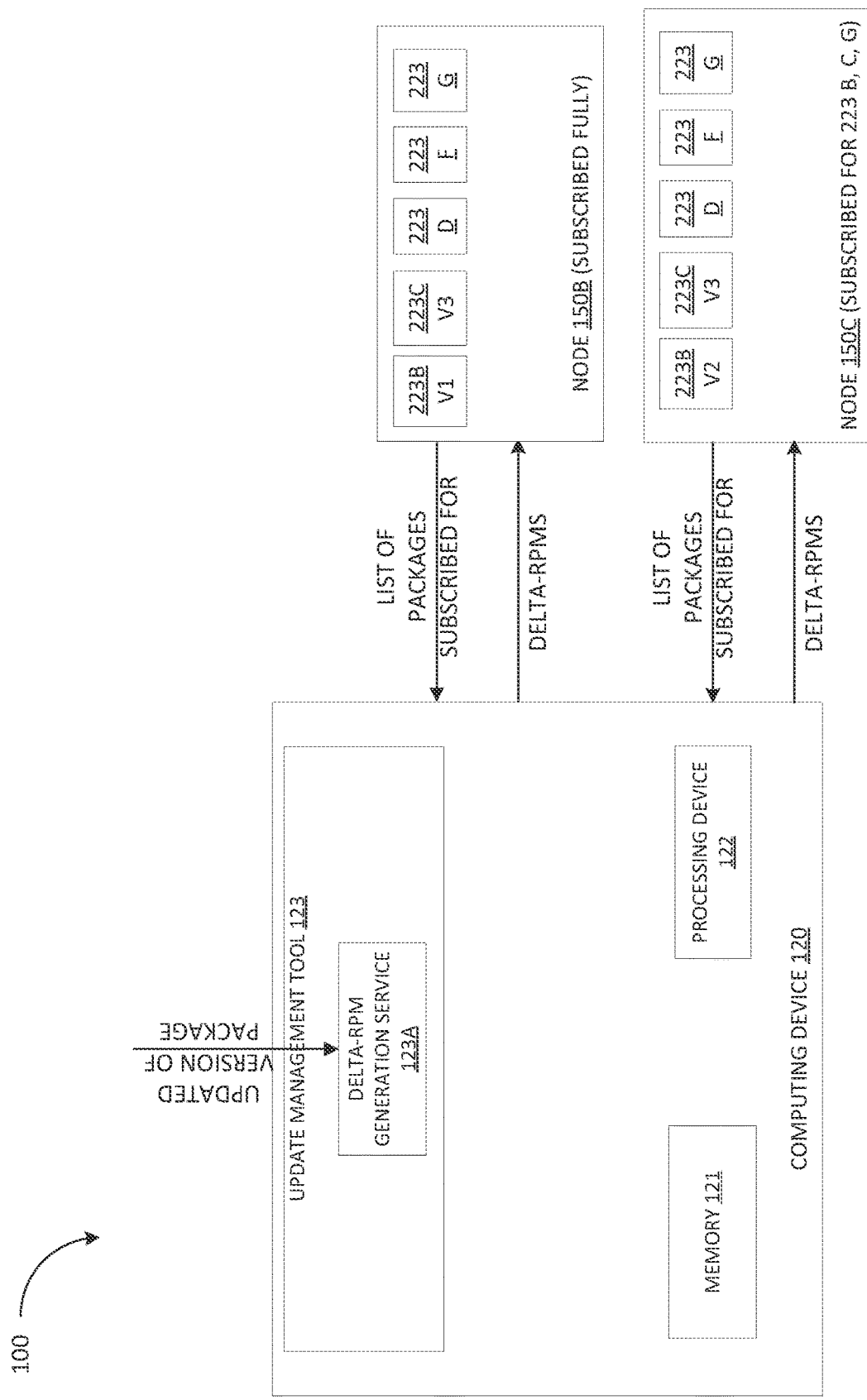
FIG. 3B is a block diagram that illustrates various nodes of a domain subscribing to a delta-difference generation service in an on-demand basis, in accordance with some embodiments of the present disclosure.

Referring to FIGS. 3A and 3B, nodes 150B and 150C may transmit an indication that they wish to subscribe to the delta-difference generation service 123A and may include as part of the indication a list of packages 223 they wish to subscribe to the delta-difference generation service 123A for. Each node 150B and 150C may determine whether they wish to subscribe and generate their respective list from packages 223 that are running on the node. In some embodiments, once the respective package manager 224 of the node has determined which packages 223 of the node can be updated, each node 150B and 150C may determine whether they wish to subscribe and generate their respective list from the packages 223 that can be updated. Then, the list of packages 223 for which the node wishes to subscribe to the delta-difference generation service 123A for can be compiled in several ways. In one example, a node 150 may utilize network diagnostics tools (e.g., the update management tool 123) to obtain information regarding which packages 223 update on a frequent basis, and may analyze its resource availability and the types of services it provides. The node 150 may determine, based on the above information, whether it should subscribe to the delta-difference generation service 123A and on what basis (e.g., whether it should subscribe for all of the packages 223 running on it or only for particular packages 223 and which particular packages 223 should be included in the list if the node 150 is only subscribing for particular packages). In the example of FIG. 3, node 150B has subscribed to the delta-difference generation service 123A for each of its packages 223 and node 150C has subscribed to the delta-difference generation service 123A for packages 223B, C, and G. The packages 223B, C, and G may represent packages that will benefit the most from use of the delta-difference generation service 123A among all of the packages 223 running on node 150C. For example, the packages 223B, C, and G may represent those packages that update most frequently, and are associated with services that are dynamic/resource intensive.

With respect to the type of services a node 150 provides, certain nodes 150 may be more susceptible to frequent updates because of the nature of the services running on them. For example, the service executing on a particular node may be very dynamic (e.g., read/write intensive, frequently updated) which may make the particular node 150 a good candidate for subscribing. By contrast, a node that is dedicated to authentication services may only execute authentication services which are not subject to frequent updates, and thus may not be a good candidate for subscribing to the delta-difference generation service 123A. Each node 150 may utilize network diagnostic information as well as available resource information to determine whether and on what basis (e.g., all packages, particular packages) they will subscribe to the delta-difference generation service 123A.

In some embodiments, a node 150 may determine whether it should subscribe fully or not based on every package 223 that can be updated, and if it determines that it should subscribe, may include every package 223 that can be updated in the list. In other embodiments, a node 150 may filter every package 223 that can be updated by package size and only subscribe to the delta-difference generation service 123A for those packages 223 that are above a size threshold that may be predefined by e.g., an administrator. Although discussed with respect to this decision making being done by individual nodes 150 themselves, in some embodiments the decision as to whether a node 150 will subscribe and on what basis may be made by e.g., an administrator.

In the example of FIG. 3A, the update management tool 123 may monitor the packages indicated in the list received from nodes 150B (223B, C, D, F, G) and 150C (223B, C, G), determine a current version of each of the subscribed packages, receive incoming updates for each subscribed package (update management tool 123 has awareness of the package ecosystem), generate the delta-difference for each subscribed package as they are needed, and enforce a push down of the delta-difference to the relevant node 150 for update at the next available opportunity. In the example of FIG. 3A, the delta-difference generation service 123A may determine that the current version of packages 223B and 223C is V1 and V3 respectively for nodes 150B and 150C, and identify 223BV2 as a new update for package 223B and identify 223CV4 as a new update for package 223C. The delta-difference generation service 123A may determine a delta-difference for package 223B between V1 and V2, determine a delta-difference for package 223C between V3 and V4, and transmit each delta-difference to both nodes 150B and 150C. The delta-difference generation service 123A may also determine a current version of package 223D as V2, determine that a new update for package 223D (223DV3) has arrived, and generate a delta-difference for package 223D between V2 and V3. The delta-difference generation service 123A may only send the delta-difference generated for package 223D to node 150B as node 150C has not subscribed to it. In addition, the delta-difference generation service 123A may not monitor for or generate delta-differences for package 223A regardless of whether any updates for it have arrived, because none of the nodes 150 have subscribed for package 223A. In some embodiments, delta-differences can be generated and transmitted to the relevant nodes 150 when those nodes 150 are ready for the update, and there may be situations in which nodes 150 may wait to receive an update or skip an update altogether. For example, a node 150 may wish to skip certain updates for a package 223 that only include minor updates to avoid consuming resources in exchange for relatively small increases in performance, particularly if the package 223 in question is one that updates at a very frequent basis.

The delta-difference generation service 123A may ensure data de duplication, by ensuring that a delta-difference generated between two specific versions of a package is not generated multiple times (e.g., for each node 150 that has subscribed for the package), as well as curation to prevent old delta-differences from being stored while they are not in use. The delta-difference generation service 123A may perform this curation in several ways based on a variety of curation criteria (also referred to herein as deletion criteria). In one example, the delta-difference generation service 123A may utilize a version based method where when a new update for a package 223 has been identified, all delta-differences related to old versions of the package 223 may be deleted from memory. In another example, the delta-difference generation service 123A may utilize a time-based approach wherein all delta-differences that have been stored for longer than a threshold amount of time (e.g., 24 hours) are deleted. In another example, the delta-difference generation service 123A may utilize an amount based approach wherein all delta-differences that have been downloaded more than a threshold number of times are deleted. The delta-difference generation service 123A may also use a usage based approach where all delta-differences that have not been downloaded a minimum number of times over a predefined time period may be deleted. In addition, the delta-difference generation service 123A may utilize a combination of one or more of the above methods (deletion criteria) that can be based on the needs of the domain at a given time (e.g., if storage space is low, then the update management tool 123 may want to reduce the amount of time a delta-difference is stored).

Embodiments of the present disclosure ensure that delta-difference generation is performed on demand on a node by node basis and that computational resources are not wasted generating unnecessary/ineffective delta-differences. The techniques herein enable individual nodes (or an administrator) to specify a package by package on demand strategy for each node and change it based on the changing needs of the node. The embodiments described herein also prevent the risk of stale delta-differences being made available, which would in turn adversely affect storage availability as well as result in a deviation from what the domain perceives as the latest version of a package. In addition, in the context of a low power device mesh, embodiments of the present disclosure bring mesh wide access to delta-differences in a way that is cognizant of the workload being placed on low power devices.

Figure 4:
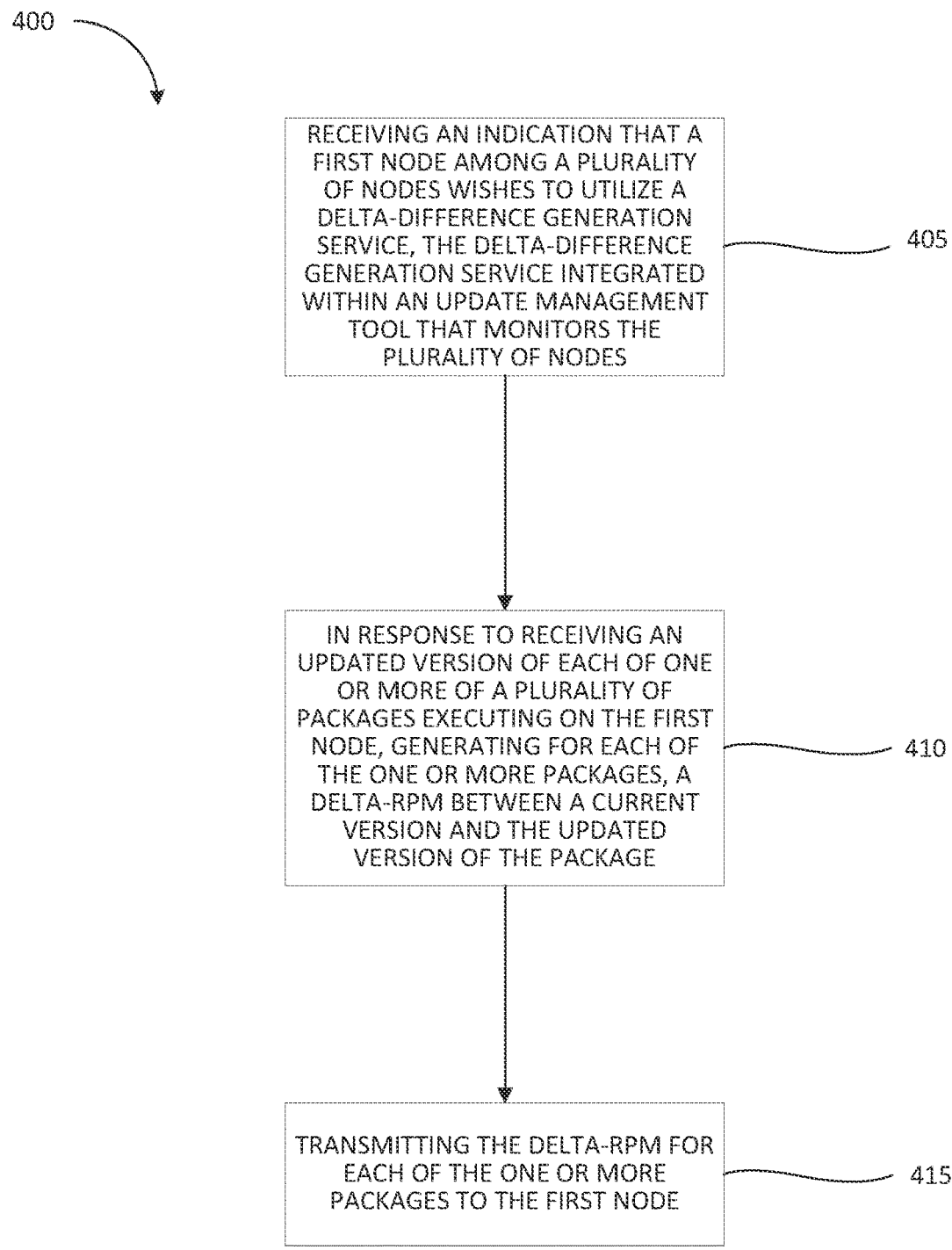
FIG. 4 is a flow diagram of a method of generating delta-differences in an on-demand fashion, in accordance with some embodiments of the present disclosure.

FIG. 4 is a flow diagram of a method 400 for generating delta-differences in an on-demand manner, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIGS. 2B-3B).

Referring simultaneously to FIGS. 2B-3B, at block 405 the processing device 122 (executing update management tool 123) may receive an indication from nodes 150B and 150C that they wish to subscribe to the delta-difference generation service 123A. More specifically, nodes 150B and 150C may transmit an indication that they wish to subscribe to the delta-difference generation service 123A and may include as part of the indication a list of packages 223 they wish to subscribe to the delta-difference generation service 123A for. Each node 150B and 150C may determine whether they wish to subscribe and generate their respective list from packages 223 that are running on the node. In some embodiments, once the respective package manager 224 of the node has determined which packages 223 of the node can be updated, each node 150B and 150C may determine whether they wish to subscribe and generate their respective list from the packages 223 that can be updated. Then, the list of packages 223 for which the node wishes to subscribe to the delta-difference generation service 123A for can be compiled in several ways. In one example, a node 150 may utilize network diagnostics tools (e.g., the update management tool 123) to obtain information regarding which packages 223 update on a frequent basis, and may analyze its resource availability and the types of services it provides. The node 150 may determine, based on the above information, whether it should subscribe to the delta-difference generation service 123A and on what basis (e.g., whether it should subscribe for all of the packages 223 running on it or only for particular packages 223 and which particular packages 223 should be included in the list if the node 150 is only subscribing for particular packages). In the example of FIG. 3, node 150B has subscribed to the delta-difference generation service 123A for each of its packages 223 and node 150C has subscribed to the delta-difference generation service 123A for packages 223B, C, and G. The packages 223B, C, and G may represent packages that will benefit the most from use of the delta-difference generation service 123A among all of the packages 223 running on node 150C. For example, the packages 223B, C, and G may represent those packages that update most frequently, and are associated with services that are dynamic/resource intensive.

In the example of FIG. 3A, at block 410, the update management tool 123 may monitor the packages indicated in the list received from nodes 150B (223B, C, D, F, G) and 150C (223B, C, G), determine a current version of each of the subscribed packages, receive incoming updates for each subscribed package (update management tool 123 has awareness of the package ecosystem), generate the delta-difference for each subscribed package as they are needed, and enforce a push down of the delta-difference to the relevant node 150 for update at the next available opportunity. In the example of FIG. 3A, the delta-difference generation service 123A may determine that the current version of packages 223B and 223C is V1 and V3 respectively for nodes 150B and 150C, and identify 223BV2 as a new update for package 223B and identify 223CV4 as a new update for package 223C. The delta-difference generation service 123A may determine a delta-difference for package 223B between V1 and V2, determine a delta-difference for package 223C between V3 and V4, and at block 415, transmit each delta-difference to both nodes 150B and 150C. The delta-difference generation service 123A may also determine a current version of package 223D as V2, determine that a new update for package 223D (223DV3) has arrived, and generate a delta-difference for package 223D between V2 and V3. The delta-difference generation service 123A may only send the delta-difference generated for package 223D to node 150B as node 150C has not subscribed to it. In addition, the delta-difference generation service 123A may not monitor for or generate delta-differences for package 223A regardless of whether any updates for it have arrived, because none of the nodes 150 have subscribed for package 223A. In some embodiments, delta-differences can be generated and transmitted to the relevant nodes 150 when those nodes 150 are ready for the update.

Figure 5:
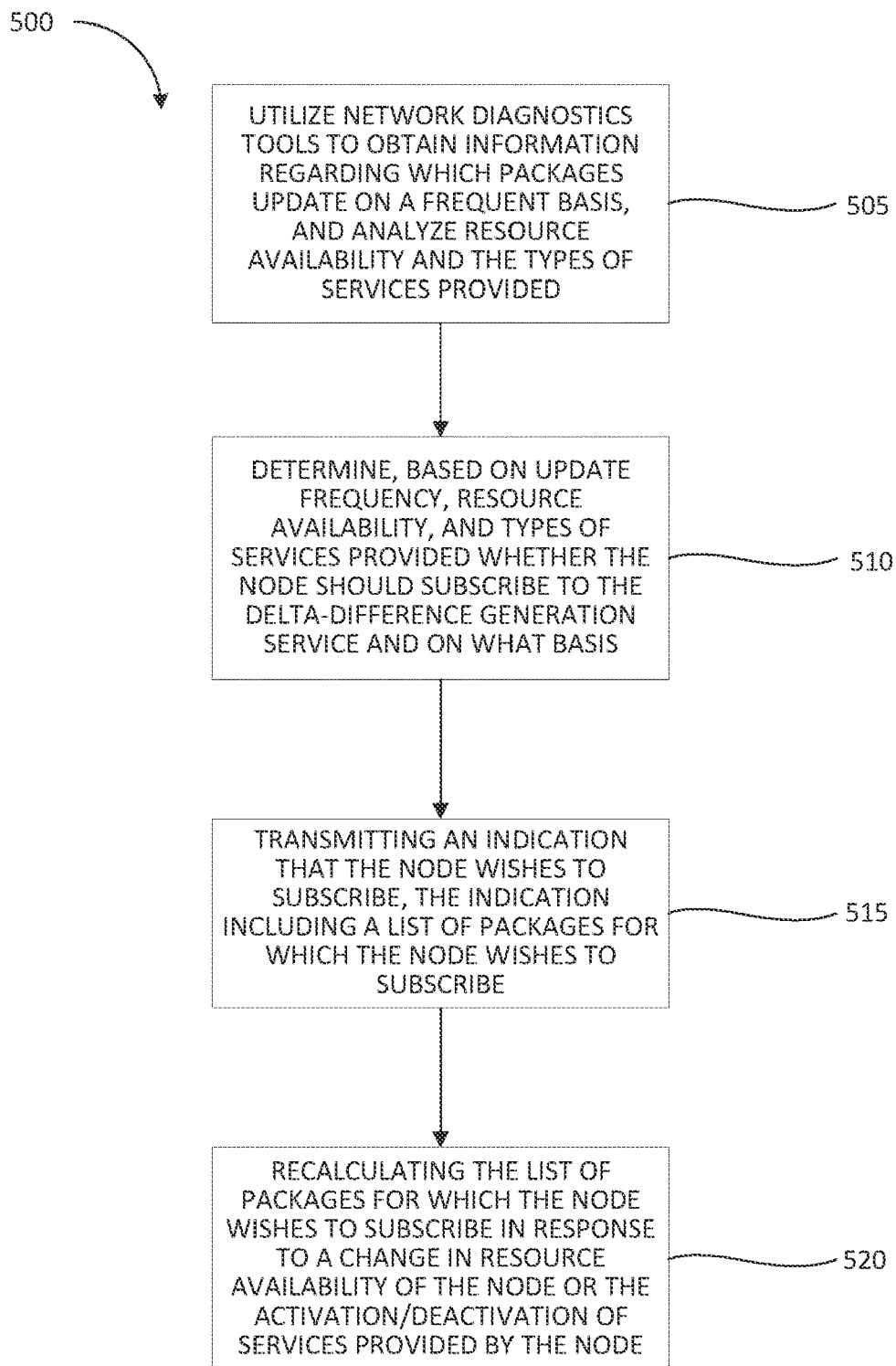
FIG. 5 is a flow diagram of a method of updating tags and promoting tags at a global level, in accordance with some embodiments of the present disclosure.

FIG. 5 is a flow diagram of a method 500 of determining how a node 150 will subscribe to the delta-difference generation service 123A, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIGS. 2B-3B).

The update management tool 123 may offer nodes 150 the ability to subscribe to and unsubscribe from the delta-difference generation service 123A based on a variety of factors (as discussed herein), and may also allow nodes 150 to customize how they will subscribe. For example, a node 150 may subscribe to the delta-difference generation service 123A for certain packages 223 it is executing or for all of the packages 223 it is executing. In this way, the nodes 150 that can benefit the most from the delta-difference generation service 123A can subscribe to it, or may subscribe to it with respect to particular packages 223 that may benefit the most, if certain packages would not benefit and/or subscribing with respect to all of the packages running on a node 150 would not be an efficient use of resources. In this way, nodes 150 that would benefit less from the delta-difference generation service 123A may refrain from doing so or refrain from subscribing with respect to particular packages 223 that would benefit less.

At block 505, a node 150 may utilize network diagnostics tools (e.g., the update management tool 123) to obtain information regarding which packages 223 update on a frequent basis, and may analyze its resource availability and the types of services it provides. At block 510, the node 150 may determine, based on the above information, whether it should subscribe to the delta-difference generation service 123A and on what basis (e.g., whether it should subscribe for all of the packages 223 running on it or only for particular packages 223 and which particular packages 223 should be included in the list if the node 150 is only subscribing for particular packages). At block 515, in the example of FIG. 3, node 150B wishes to subscribe for all of its packages 223 and transmits to the update management tool 123 an indication that it wishes to subscribe including a list indicating all of its packages 223. Node 150C transmits to the update management tool 123 an indication that it wishes to subscribe including a list indicating packages 223B, C, and G. The packages 223B, C, and G may represent packages that will benefit the most from use of the delta-difference generation service 123A among all of the packages 223 running on node 150C. For example, the packages 223B, C, and G may represent those packages that update most frequently, and are associated with services that are dynamic/resource intensive.

Because resource availability of a node 150 may change over time, and certain services may be activated or suspended over time, at block 520 each node 150 may also update its list of packages for which it wishes to subscribe to the delta-difference generation service 123A on any appropriate basis (by performing the same analysis as described above). For example, a node 150 may update its list periodically, or in response to sudden shifts in the availability of resources or activation/deactivation of certain services.

Figure 6:
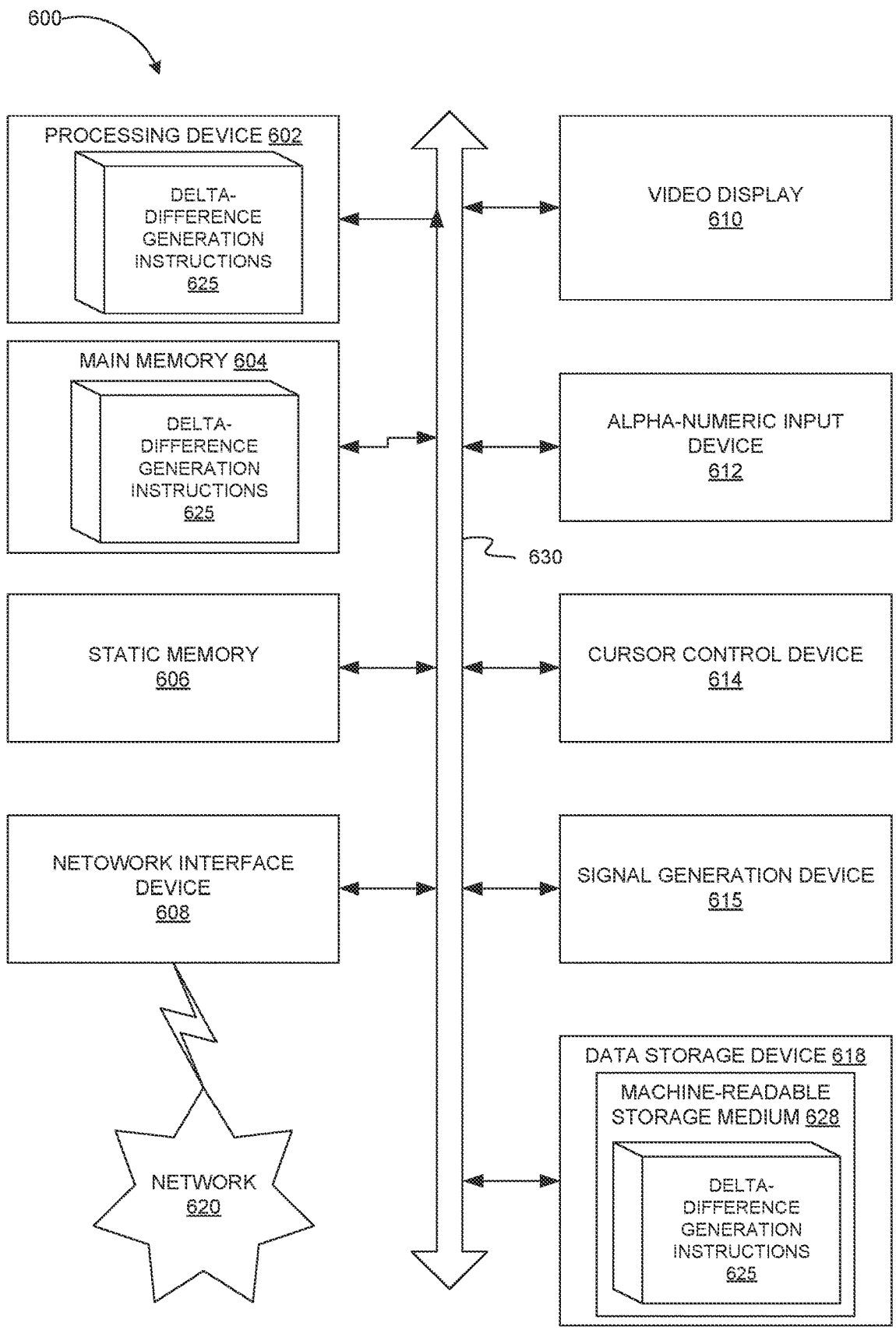
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for generating delta-differences for packages on an on-demand basis.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute delta-difference generation instructions 625, for performing the operations and steps discussed herein.

The data storage device 618 may include a machine-readable storage medium 628, on which is stored one or more sets of delta-difference generation instructions 625 (e.g., software) embodying any one or more of the methodologies of functions described herein. The delta-difference generation instructions 625 may also reside, completely or at least partially, within the main memory 604 or within the processing device 602 during execution thereof by the computer system 600; the main memory 604 and the processing device 602 also constituting machine-readable storage media. The delta-difference generation instructions 625 may further be transmitted or received over a network 620 via the network interface device 608.

The machine-readable storage medium 628 may also be used to store instructions to perform a method for object analysis/validation event publishing, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: receiving an indication that a first node among a plurality of nodes wishes to utilize a delta-difference generation service, the delta-difference generation service integrated within an update management tool that monitors the plurality of nodes; in response to receiving an updated version of each of one or more of a plurality of packages executing on the first node, generating, by a processing device, for each of the one or more packages, a delta-difference between a current version and the updated version of the package; and transmitting the delta-difference for each of the one or more packages to the first node.

Example 2 is the method of example 1, wherein the indication specifies a set of packages among the plurality of packages executing on the first node for which the first node wishes to utilize the delta-difference generation service, and the one or more packages corresponds to the set of packages.

Example 3 is the method of example 2, further comprising: determining the set of packages for which the first node wishes to utilize the delta-difference generation service based on one or more of: an update frequency of each of the plurality of packages executing on the first node, a resource availability of the first node, and a type of services provided by the first node.

Example 4 is the method of example 1, further comprising: for each of the one or more packages, deleting a previous delta-difference generated based on a previous version of the package, the deleting performed in response to one or more deletion criteria, the deletion criteria comprising: receiving the updated version of the package, a threshold amount of time having passed since generation of the previous delta-difference, the previous delta-difference being downloaded a threshold number of times, and the previous delta-difference not being downloaded a minimum number of times over a predefined time period.

Example 5 is the method of example 4, wherein the one or more deletion criteria is based at least in part on resource needs of the first node.

Example 6 is the method of claim 1, further comprising: receiving a second indication that a second node among the plurality of nodes wishes to utilize the delta-difference generation service, the second indication specifying a group of packages among a plurality of packages executing on the second node for which the second node wishes to utilize the delta-difference generation service.

Example 7 is the method of claim 1, further comprising: determining for the first node, an updated list of packages for which the first node wishes to subscribe to the delta-difference generation service based on one or more of: a modified update frequency of each of the plurality of packages executing on the first node, a modified resource availability of the first node, and the type of services provided by the first node.

Example 8 is a system comprising: a memory; and a processing device operatively coupled to the memory, the processing device to: receive, from each of one or more of a plurality of nodes, a list of packages for which the node wishes to utilize a delta-difference generation service; in response to receiving an updated version of a package included in a list received from any of the one or more nodes, generate a delta-difference between a current version and the updated version of the package; and transmit the delta-difference to each of the one or more nodes that included the first package in their respective list.

Example 9 is the system of example 8, wherein, the delta-difference generation service is integrated within an update management tool that monitors the plurality of nodes.

Example 10 is the system of example 9, wherein the processing device is further to: transmit, using the update management tool, to each of the one or more nodes, an update frequency of each of the plurality of packages executing on the node, wherein each of the one or more nodes determines their corresponding list of packages based on one or more of: the update schedule of each of the plurality of packages executing on the node, a resource availability of the node, and a type of services provided by the node.

Example 11 is the system of example 8, wherein the processing device is further to: determine, for each of the one or more nodes, the corresponding list of packages based on one or more of: an update frequency of each of the plurality of packages executing on the node, a resource availability of the node, and a type of services provided by the node.

Example 12 is the system of example 8, wherein the processing device is further to: for each package included in a list received from any of the one or more nodes, delete a previous delta-difference generated based on a previous version of the package, the deleting performed in response to one or more deletion criteria, the deletion criteria comprising: receiving an updated version of the package, a threshold amount of time having passed since generation of the previous delta-difference, the previous delta-difference being downloaded a threshold number of times, and the previous delta-difference not being downloaded a minimum number of times over a predefined time period.

Example 13 is the system of example 12, wherein the processing device determines the one or more deletion criteria based on resource needs of the one or more nodes.

Example 14 is the system of example 11, wherein the processing device is further to: determine, for each of the one or more nodes, an updated list of packages for which the node wishes to subscribe to the delta-difference generation service based on one or more of: a modified update frequency of each of the plurality of packages executing on the node, a modified resource availability of the node, and the type of services provided by the node.

Example 15 is a non-transitory computer-readable medium having instructions stored thereon which, when executed by a processing device, cause the processing device to: receive an indication that a first node among a plurality of nodes wishes to utilize a delta-difference generation service, the delta-difference generation service integrated within an update management tool that monitors the plurality of nodes; in response to receiving an updated version of each of one or more of a plurality of packages executing on the first node, generate, by the processing device, for each of the one or more packages, a delta-difference between a current version and the updated version of the package; and transmit the delta-difference for each of the one or more packages to the first node.

Example 16 is the non-transitory computer-readable medium of example 15, wherein the indication specifies a set of packages among the plurality of packages executing on the first node for which the first node wishes to utilize the delta-difference generation service, and the one or more packages corresponds to the set of packages.

Example 17 is the non-transitory computer-readable medium of example 16, wherein the processing device is further to: determine the set of packages for which the first node wishes to utilize the delta-difference generation service based on one or more of: an update frequency of each of the plurality of packages executing on the first node, a resource availability of the first node, and a type of services provided by the first node.

Example 18 is the non-transitory computer-readable medium of example 15, wherein the processing device is further to: for each of the one or more packages, delete a previous delta-difference generated based on a previous version of the package, the deleting performed in response to one or more deletion criteria, the deletion criteria comprising: receiving the updated version of the package, a threshold amount of time having passed since generation of the previous delta-difference, the previous delta-difference being downloaded a threshold number of times, and the previous delta-difference not being downloaded a minimum number of times over a predefined time period.

Example 19 is the non-transitory computer-readable medium of example 18, wherein the processing device determines the one or more deletion criteria based at least in part on resource needs of the first node.

Example 20 is the non-transitory computer-readable medium of example 15, wherein the processing device is further to: receive a second indication that a second node among the plurality of nodes wishes to utilize the delta-difference generation service, the second indication specifying a group of packages among a plurality of packages executing on the second node for which the second node wishes to utilize the delta-difference generation service.

Example 21 is the non-transitory computer-readable medium of example 15, wherein the processing device is further to: determine for the first node, an updated list of packages for which the first node wishes to subscribe to the delta-difference generation service based on one or more of: a modified update frequency of each of the plurality of packages executing on the first node, a modified resource availability of the first node, and the type of services provided by the first node.

Example 22 is a system comprising: a memory; and a processing device operatively coupled to the memory, the processing device to: receive an indication that a first node among a plurality of nodes wishes to utilize a delta-difference generation service, the delta-difference generation service integrated within an update management tool that monitors the plurality of nodes; in response to receiving an updated version of each of one or more of a plurality of packages executing on the first node, generate for each of the one or more packages, a delta-difference between a current version and the updated version of the package; and transmit the delta-difference for each of the one or more packages to the first node.

Example 23 is the system of example 22, wherein the indication specifies a set of packages among the plurality of packages executing on the first node for which the first node wishes to utilize the delta-difference generation service, and the one or more packages corresponds to the set of packages.

Example 24 is the system of example 23, wherein the processing device is further to: determine the set of packages for which the first node wishes to utilize the delta-difference generation service based on one or more of: an update frequency of each of the plurality of packages executing on the first node, a resource availability of the first node, and a type of services provided by the first node.

Example 25 is the system of example 22, wherein the processing device is further to: for each of the one or more packages, delete a previous delta-difference generated based on a previous version of the package, the deleting performed in response to one or more deletion criteria, the deletion criteria comprising: receiving the updated version of the package, a threshold amount of time having passed since generation of the previous delta-difference, the previous delta-difference being downloaded a threshold number of times, and the previous delta-difference not being downloaded a minimum number of times over a predefined time period.

Example 26 is the system of example 25, wherein the processing device determines the one or more deletion criteria based at least in part on resource needs of the first node.

Example 27 is the system of example 22, wherein the processing device is further to: receive a second indication that a second node among the plurality of nodes wishes to utilize the delta-difference generation service, the second indication specifying a group of packages among a plurality of packages executing on the second node for which the second node wishes to utilize the delta-difference generation service.

Example 28 is the system of example 22, wherein the processing device is further to: determine for the first node, an updated list of packages for which the first node wishes to subscribe to the delta-difference generation service based on one or more of: a modified update frequency of each of the plurality of packages executing on the first node, a modified resource availability of the first node, and the type of services provided by the first node.

Example 29 is a method comprising: receiving, from each of one or more of a plurality of nodes, a list of packages for which the node wishes to utilize a delta-difference generation service; in response to receiving an updated version of a package included in a list received from any of the one or more nodes, generating a delta-difference between a current version and the updated version of the package; and transmitting the delta-difference to each of the one or more nodes that included the first package in their respective list.

Example 30 is the method of example 29, wherein, the delta-difference generation service is integrated within an update management tool that monitors the plurality of nodes.

Example 31 is the method of example 30, further comprising: transmitting, using the update management tool, to each of the one or more nodes, an update frequency of each of the plurality of packages executing on the node, wherein each of the one or more nodes determines their corresponding list of packages based on one or more of: the update schedule of each of the plurality of packages executing on the node, a resource availability of the node, and a type of services provided by the node.

Example 32 is the method of example 29, further comprising: determining, for each of the one or more nodes, the corresponding list of packages based on one or more of: an update frequency of each of the plurality of packages executing on the node, a resource availability of the node, and a type of services provided by the node.

Example 33 is the method of example 29, further comprising: for each package included in a list received from any of the one or more nodes, deleting a previous delta-difference generated based on a previous version of the package, the deleting performed in response to one or more deletion criteria, the deletion criteria comprising: receiving an updated version of the package, a threshold amount of time having passed since generation of the previous delta-difference, the previous delta-difference being downloaded a threshold number of times, and the previous delta-difference not being downloaded a minimum number of times over a predefined time period.

Example 34 is the method of example 33, wherein the one or more deletion criteria is based on resource needs of the one or more nodes.

Example 35 is the method of example 32, further comprising: determining, for each of the one or more nodes, an updated list of packages for which the node wishes to subscribe to the delta-difference generation service based on one or more of: a modified update frequency of each of the plurality of packages executing on the node, a modified resource availability of the node, and the type of services provided by the node.

Example 36 is an apparatus comprising: means for receiving an indication that a first node among a plurality of nodes wishes to utilize a delta-difference generation service, the delta-difference generation service integrated within an update management tool that monitors the plurality of nodes; means for generating for each of the one or more packages, in response to receiving an updated version of each of one or more of a plurality of packages executing on the first node, a delta-difference between a current version and the updated version of the package; and means for transmitting the delta-difference for each of the one or more packages to the first node.

Example 37 is the apparatus of example 36, wherein the indication specifies a set of packages among the plurality of packages executing on the first node for which the first node wishes to utilize the delta-difference generation service, and the one or more packages corresponds to the set of packages.

Example 38 is the apparatus of example 37, further comprising: means for determining the set of packages for which the first node wishes to utilize the delta-difference generation service based on one or more of: an update frequency of each of the plurality of packages executing on the first node, a resource availability of the first node, and a type of services provided by the first node.

Example 39 is the apparatus of example 36, further comprising: means for deleting, for each of the one or more packages, a previous delta-difference generated based on a previous version of the package, the deleting performed in response to one or more deletion criteria, the deletion criteria comprising: receiving the updated version of the package, a threshold amount of time having passed since generation of the previous delta-difference, the previous delta-difference being downloaded a threshold number of times, and the previous delta-difference not being downloaded a minimum number of times over a predefined time period.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   transmitting, from an update management tool to a node, update frequency information of a plurality of packages executing on the node;
   receiving, from the node, a list of one or more packages for which the node wishes to subscribe to a delta-difference generation service integrated within the update management tool based on the update frequency information;
   receiving an indication that the node will utilize the delta-difference generation service with respect to a package executing on the node;
   verifying that the node has subscribed to the delta-difference generation service for the package by verifying that the package is included in the list;
   detecting, by the update management tool, an updated version of the package;
   generating, by a processing device in response to the detecting, a delta-difference between a current version and the updated version of the package;
   deleting, at the update management tool, a previous delta-difference generated based on a previous version of the package;
   transmitting the delta-difference for the package to the node; and
   installing, on the node, the updated version of the package using the delta-difference by causing the node to combine an old version of the package with the delta difference of the package.

2. The method of claim 1, wherein the deleting is performed in response to one or more deletion criteria comprising at least one of: receiving the updated version of the package, a threshold amount of time having passed since generation of the previous delta-difference, the previous delta-difference being downloaded a threshold number of times, or the previous delta-difference not being downloaded a minimum number of times over a predefined time period.

3. The method of claim 2, wherein the one or more deletion criteria is based at least in part on resource needs of the node.

4. The method of claim 1, further comprising:
   determining, for the node, an updated list of packages for which the node will utilize the delta-difference generation service based on one or more of: a modified update frequency of each of the plurality of packages executing on the node, a modified resource availability of the node, and the types of services provided by the node.

5. A system comprising:
   a memory; and
   a processing device operatively coupled to the memory, the processing device to:
      transmit, to a node, update frequency information of a plurality of packages executing on the node;
      receive, from the node, a list of one or more packages for which the node wishes to subscribe to a delta-difference generation service integrated within an update management tool based on the update frequency information;
      receive an indication that the first node will utilize the delta-difference generation service with respect to a package executing on the node;
      verify that the node has subscribed to the delta-difference generation service for the package by verifying that the package is included in the list;
      detect, by the update management tool, an updated version of the package;
      generate, in response to detecting the updated version, a delta-difference between a current version and the updated version of the package;
      delete, at the update management tool, a previous delta-difference generated based on a previous version of the package; and
      install, on the node, the updated version of the package using the delta-difference by causing the node to combine an old version of the package with the delta difference of the package.

6. The system of claim 5, wherein the processing device is to delete the previous delta-difference
   in response to one or more deletion criteria comprising at least one of: receiving an updated version of the package, a threshold amount of time having passed since generation of the previous delta-difference, the previous delta-difference being downloaded a threshold number of times, or the previous delta-difference not being downloaded a minimum number of times over a predefined time period.

7. The system of claim 6, wherein the processing device determines the one or more deletion criteria based on resource needs of the node.

8. The system of claim 5, wherein the processing device is further to:
  determine, for the node, an updated list of packages for which the node will subscribe to the delta-difference generation service based on one or more of: a modified update frequency of each of the plurality of packages executing on the node, a modified resource availability of the node, and the type of services provided by the node.

9. A non-transitory computer-readable medium having instructions stored thereon which, when executed by a processing device, cause the processing device to:
  transmit, to a node, update frequency information of a plurality of packages executing on the node;
  receive, from the node, a list of one or more packages for which the node wishes to subscribe to a delta-difference generation service integrated within an update management tool;
  receive an indication that the first node will utilize the delta-difference generation service with respect to a package executing on the node;
  verify that the node has subscribed to the delta-difference generation service for the package by verifying that the package is included in the list;
  detect, by the update management tool, an updated version of the package;
  generate, by the processing device in response to detecting the updated version, a delta-difference between a current version and the updated version of the package;
  delete, at the update management tool, a previous delta-difference generated based on a previous version of the package;
  transmit the delta-difference for each of the one or more packages to the node; and
  install, on the node, the updated version of the package using the delta-difference by causing the node to combine an old version of the package with the delta difference of the package.

10. The non-transitory computer-readable medium of claim 9, wherein the instructions cause the processing device to delete the previous delta-difference
  in response to one or more deletion criteria comprising at least one of: receiving the updated version of the package, a threshold amount of time having passed since generation of the previous delta-difference, the previous delta-difference being downloaded a threshold number of times, or the previous delta-difference not being downloaded a minimum number of times over a predefined time period.

11. The non-transitory computer-readable medium of claim 10, wherein the instructions cause the processing device to determine the one or more deletion criteria based at least in part on resource needs of the node.

* * * * *